United States Patent [19]

Hubred et al.

[11] 4,434,141
[45] Feb. 28, 1984

[54] RECOVERY OF COBALT, MOLYBDENUM, NICKEL AND VANADIUM FROM AN AQUEOUS AMMONIA AND AMMONIUM SALT SOLUTION BY COEXTRACTING MOLYBDENUM AND VANADIUM AND SEQUENTIAL EXTRACTION OF NICKEL AND COBALT

[75] Inventors: Gale L. Hubred, Richmond; Dean A. Van Leirsburg, Petaluma, both of Calif.

[73] Assignee: Chevron Research Company, San Francisco, Calif.

[21] Appl. No.: 422,987

[22] Filed: Sep. 24, 1982

[51] Int. Cl.³ .................. C01G 39/00; C01G 41/00; C01G 51/00; C01G 31/00
[52] U.S. Cl. .......................................... 423/54; 423/63; 423/139; 75/101 BE
[58] Field of Search ..................... 423/54, 63, 139; 75/101 BE

[56] References Cited

U.S. PATENT DOCUMENTS

| | | | |
|---|---|---|---|
| 3,773,890 | 11/1973 | Fox et al. | 423/63 |
| 4,012,483 | 3/1977 | Kane et al. | 423/139 |
| 4,145,397 | 3/1979 | Toida et al. | 423/63 |
| 4,258,016 | 3/1981 | Siemens et al. | 423/139 |

FOREIGN PATENT DOCUMENTS

| | | | |
|---|---|---|---|
| 53-109100 | 2/1978 | Japan | 423/54 |
| 115603 | 10/1978 | Japan | 423/63 |
| 1342400 | 1/1974 | United Kingdom | 423/139 |

Primary Examiner—Herbert T. Carter
Attorney, Agent, or Firm—D. A. Newell; S. R. La Paglia; V. J. Cavalieri

[57] ABSTRACT

A method of recovering metal values from an aqueous stream. The metal values are preferably obtained from leaching spent hydroprocessing catalysts, and include nickel, cobalt, vanadium and molybdenum. The metal values are extracted, isolated and purified by liquid, liquid extraction techniques.

4 Claims, 1 Drawing Figure

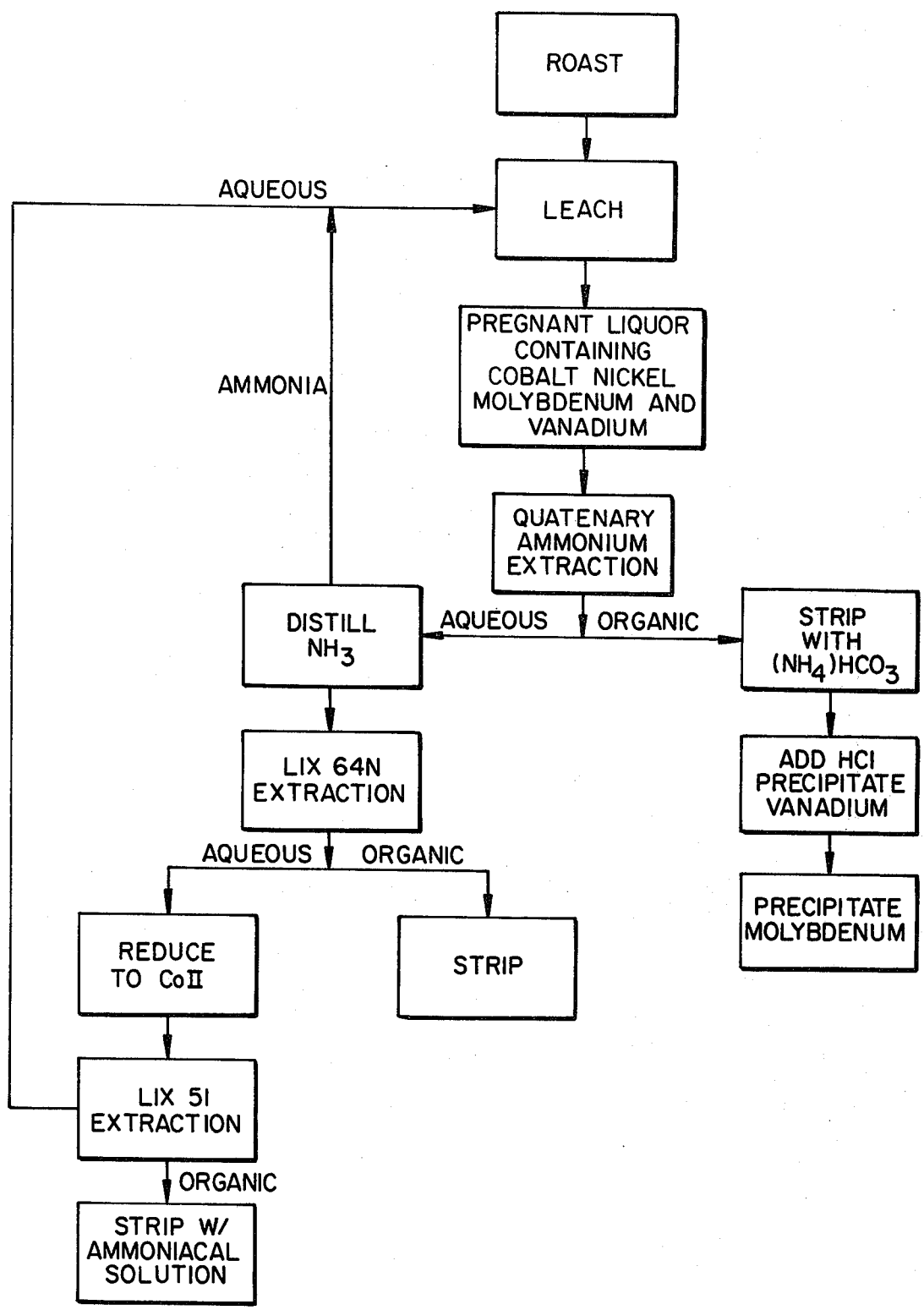

RECOVERY OF COBALT, MOLYBDENUM, NICKEL AND VANADIUM FROM AN AQUEOUS AMMONIA AND AMMONIUM SALT SOLUTION BY COEXTRACTING MOLYBDENUM AND VANADIUM AND SEQUENTIAL EXTRACTION OF NICKEL AND COBALT

BACKGROUND OF THE INVENTION

This invention relates to methods of separating mixtures of metals from each other in aqueous solution. In particular, methods for separating mixtures at least one Group VIII metal from at least one metal from Group V and Group VI to form single metal salt solutions.

Many hydrocarbon feedstocks contain high percentages of metals, particularly iron, nickel and vanadium or tungsten. These metals tend to deposit on the surfaces of hydroprocessing catalysts which contain catalytic hydroprocessing metals, frequently cobalt or nickel and molybdenum or tungsten. When the hydroprocessing catalysts no longer give desired conversion rates, due in part to metals deposits plugging the catalyst's pores, they are replaced and disposed of. Because of growing shortages of petroleum in the world, refiners must use feedstocks that contain larger amounts of metals than those feedstocks heretofore used resulting in more spent catalysts. It is therefore desirable to recycle catalyst components. Recycling spent catalyst components would also reduce problems attendant with disposal of spent catalysts.

Spent catalysts containing large quantities of both catalytic metals and metals removed from the hydrocarbon stream, can be viewed as high grade ores of nickel, cobalt, molybdenum and vanadium. Recycling cobalt, a particularly expensive metal, would lessen the cost of these catalysts.

Methods are known for leaching the metals from spent catalysts. For example, U.S. Pat. No. 3,567,433, which discloses an aqueous ammonia and ammonium salt leach that removes nickel, cobalt, molybdenum and vanadium but leaves behind both the catalyst support and iron. However, once in solution, cobalt, molybdenum, vanadium and nickel need to be separated from each other in relatively pure form.

SUMMARY OF THE INVENTION

A process for separating metal values from an aqueous solution containing at least one metal value selected from Group VIII and at least one metal value selected from Group V and Group VI, comprising:
 (a) transferring said metal values of Group V and Group VI into a first organic solution by a first liquid ion exchange;
 (b) stripping said first organic solution with an aqueous first strip solution, thereby forming an aqueous solution containing said metal values selected from Group V and Group VI;
 (c) separating said metal values of Group V and Group VI in said aqueous first strip solution by sequential precipitation;
 (d) selectively transferring each of said metal values of Group VIII into an organic solution by serial liquid ion exchange;
 (e) stripping each said organic solution thereby forming a single metal containing aqueous solution.

DESCRIPTION OF THE DRAWING

The drawing shows a process flow chart of the present invention.

DETAILED DESCRIPTION OF PREFERRED EMBODIMENTS OF THE INVENTION

As petroleum refiners refine heavier crudes containing more metals, catalysts used in the hydroprocessing of crude oils and residual oils tend to accumulate large amounts of metals. At some point, during the use of the catalyst, the metals deposited on the catalysts, and other factors, reduce the activity so that the desired product specification can no longer be achieved. Such low activity, metals-containing catalysts are replaced with fresh catalyst and are herein defined as "spent catalysts". Spent catalysts can contain from 3 to 30 weight percent catalytic metals, frequently a mixture of a Group VIII metal and a Group VI metal, as well as up to 50 weight percent contaminant metals removed from the feedstock, particularly iron, nickel and vanadium, which are supported on the catalyst support. Catalyst supports include refractory inorganic oxides, in particular, alumina, silica, titania, magnesia, and the like, either singly or in combination with each other.

Leaching

The Group VIII, Group V and Group VI metals may be leached from a catalytic support that has been freed of hydrocarbonaceous residua, known as "coke", and sulfur residues. The coke and sulfur residues may be removed by roasting the catalyst particles in an oxygen gas containing atmosphere.

The roasted catalyst particles are leached in any conventional leach system that removes Group VIII, Group VI and Group V metals. A preferred method of leaching roasted spent catalyst is contacting the catalyst with an aqueous solution containing both $NH_3$ (aq), hereinafter ammonia, and $NH_4^+$ (aq), hereinafter ammonium. The concentration of ammonia should be about 2 M to 3 M and the concentration of ammonium should be roughly equal to the ammonia concentration. Preferred ammonium salts include ammonium sulfate and ammonium carbonate. At this concentration the pH of the solution should be about 8.5 to 11. A preferred temperature is about 80° to 90° C. In a typical spent catalyst, removed from desulfurization and demetalation service, the catalytic metals will be cobalt or nickel with either molybdenum or tungsten. Since nickel is frequently removed from the feedstock it is not unusual to find both nickel and cobalt together on spent catalyst.

In general, it will be desirable to perform the leaching step so as to maximize the cobalt recovery. It has been found that cobalt extraction reaches a maximum at some particular amount of leaching. The extent of cobalt leached can be followed by atomic absorption, or other method that quickly determine cobalt concentration and the leach stopped when cobalt recovery starts to fall. In typical cases this can be after as little time as 15 minutes.

It has also been observed that nickel recoveries from the ammoniacal system suffer if the roasting temperature is too high. Preferred roasting temperatures are less than about 600° C.

The metals in the solution from an ammoniacal leach, or any other process giving rise to an aqueous solution containing at least one Group VIII metal and at least one metal selected from the Group consisting of Group V and Group VI metals can then be separated by the process of this invention. During any leach of spent catalyst particles a variety of contaminants tend to go into solution, including aluminates, silicates, phosphates, sulfates and the like. By the process of the present invention the metals are removed from the impurities and separated into a plurality of aqueous metals containing solutions that can be processed further to produce pure metal salts or pure metals. The aqueous solution containing at least one metal from Group VIII and at least one metal from the Group consisting of Group V and Group VI will be hereinafter termed the "pregnant liquor", a term intended to define any metals containing aqueous solution of any origin.

Extraction of Molybdenum and Vanadium

The pregnant liquor from the ammoniacal leach is extracted sequentially with several liquid ion exchange reagents. The metal ions of interest can be divided into two categories. In the first category are metals from Group VIII, in particular cobalt and nickel, which are present in the pregnant liquor as cations. In the second category are metals selected from Group V and Group VI, in particular molybdenum, tungsten and vanadium, which are present in the pregnant liquor as oxyanions. In the practice of the present invention the oxyanions are extracted first. The metal values of Group V and Group VI are transferred into a first organic solution by a first liquid ion exchange. The extraction can be carried out directly on a pregnant liquor from an ammonia and ammonium salt leach solution. This solution typically has a pH of about 10 to 10.5. The preferred organic extractant is a quaternary ammonium compounds of the general formula $RR'_3N^+Cl^-$, where R is methyl and R' is a group ranging from $C_8$ to $C_{12}$. Such organic extractants are sold by Henkel Chemical Corporation under the trade name Aliquat ® 336 and by Sherex, under the trade name of Adogen ®, and obtainable from Aldrich Chemical as an impure compound of methyl tri-capryl ammonium chloride.

The quaternary ammonium compounds are in organic solution, preferably in hydrocarbon solution, for example, kerosene, which may be conditioned by a paraffinic alcohol such as decanol. Contacting the aqueous phase with the anion exchange reagent extracts both the molybdenum and the vanadium. The reaction can be generically depicted as:

where x and y are small whole numbers, typically between 0 and 10, and M is any Group V or VI metal oxyanion, and R can be any organic substituent that makes the quaternary amine sufficiently hydrophobic. It has been observed that when Aliquat ® is the anion exchange reagent, the extraction tends to be equilibrium limited by molybdenum. In practice it has been found that the use of multi-stage extraction units extracts molybdenum more readily than single stage extractions.

Stripping and Recovering Vanadium and Molybdenum Values

The metals are then stripped from the organic phase into aqueous phase by an aqueous solution of bicaronate or carbonate solutions or other anion. A preferred stripping solution is saturated aqueous solution of ammonium bicarbonate at a pH of about 8 and a temperature of about 0° to 30° C. It has been observed that the stripping tends to be limited by vanadium. When vanadium is known to be present, the bicarbonate strip solution has been found to be particularly well suited for stripping vanadium values from the organic phase.

When the overall process involves leaching spent catalysts with an aqueous solution of ammonia and an ammonium salt, it is preferred that the stripping solution be a saturated solution of ammonium bicarbonate. In this way new ions are not introduced into streams, allowing easy recycling of the streams to earlier steps in the process. Ammonium is preferred since ammonium meta-vanadate is a preferred product of this process.

Vanadium, if present, can be recovered from the aqueous solution by adjusting its pH to about 7 by addition of concentrated HCl. The chloride ion has been found to be important for the kinetics of the vanadium metavanadate precipitation. See the method discussed in *Zhurnal Prikladnoi Khimii*, 43, p. 949–954, 1970. Excess ammonium chloride is added to the aqueous solution and any ammonium chloride not dissolved is removed by filtration creating saturated ammonium chloride solution. The solution is warmed to 75° to 80° C. for 20 minutes then cooled slowly over a period of about 30 minutes to about 30° C. The solution is further cooled to about 0° C. for three hours. Crystals are collected while the solution is cold by filtration and washed with cold $H_2O$.

The resulting aqueous solution may contain either molybdenum or tungsten or no metals at all. The molybdenum or tungsten can be recovered by reducing the volume of the solution until the metals start to precipitate. The precipitation can be aided by adding an appropriate ion to form a less soluble salt, for example, calcium hydroxide may be added to precipitate the less soluble calcium molybdate.

Extracting and Recovering Cobalt and Nickel

The Group VIII metals, still in the pregnant liquor solution, are each selectively placed into an organic solution, by serial liquid ion exchange. Each organic solution so formed is then stripped forming an aqueous solution containing the Group VIII metal. The most prevalent Group VIII metals in the pregnant liquor of spent hydrodemetalation catalyst are nickel and cobalt.

Nickel is extracted with an organic nickel extractant. Preferred organic extractants include oximes. The hydroxy oxime component has the general formula

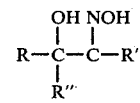

where R, R' and R" may be a variety of organic hydrocarbon radicals such as aliphatic and alkylaryl radicals. R" may also be hydrogen. Preferably, R and R' are unsaturated hydrocarbons or branched chains alkyl groups containing from about 6 to about 20 carbon atoms. R and R' are also preferably the same and an alkyl are preferably attached to the carbons substituted with the OH and NOH groups through a secondary carbon atom. It is also preferred that R" is hydrogen or unsaturated hydrocarbon or branched chain alkyl groups containing from about 6 to 20 carbon atoms.

Suitable oximes are disclosed, for example, in U.S. Pat. Nos. 3,224,873, 3,592,775, 3,455,680, 3,428,499, 3,276,863 and 3,197,274. Particularly suitable extractants comprise 2-hydroxy-4-nonylbenzophenoxime which is a primary extractant in a composition also containing an alpha-hydroxy oxime sold by Henkel Corporation under the trade name of LIX 64N ®; 8-diethyl-7-hydroxy-6-dodecanoneoxime, which is the primary extractant in a composition sold by Henkel Corporation under the trade name of LIX 63 ®; and 2-hydroxy-4-dodecylbenzophenoxime, which is primary extractant in a composition also containing an alpha-hydroxy oxime sold by Henkel Corporation under the trade name of LIX 64 ®.

The preferred extracting agent is LIX 64N ®. This agent contains about 46 to 50% beta-hydroxybenzophenoneoxime and about 1 to 2% of an aliphatic alphahydroxyoxime in a hydrocarbon diluent such as kerosene. This extracting agent provides nearly quantitative extraction of nickel and provides a very high degree of separation for nickel (II) over cobalt (III).

Nickel is stripped from the extractant by any conventional stripping solution, for example, sulfuric acid.

Cobalt is extracted next in the serial extractions. The cobalt in the pregnant liquor is in the +3 oxidation state and must be reduced to the +2 oxidation state before it can be easily extracted by convention cobalt extracting agents. Cobalt (III) is conventionally reduced to cobalt (II) by contacting the cobalt (III) solution with cobalt metal. One form of cobalt metal for this reduction is cobalt shot.

The cobalt (II) is then extracted with an extracting agent containing a metal chelating beta-diketone extractant. A preferred extractant is a beta-diketone of the formula

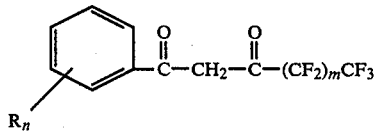

where n is 1 to 4, m is 0, 1 or 2 and R is an alkyl group of 1 to 25 carbon atoms. The compounds and their preparation are disclosed in U.S. Pat. No. 4,152,396, and the disclosure of which is also incorporated herein by reference, and is sold by Henkel Chemical under the trade name of LIX 51. Other organic cobalt (II) extractants include the oximes, dioximes and diketones aforementioned as nickel extractants. If the same extractant is used both for cobalt and nickel, selectivity can be provided by the oxidation state of cobalt.

Suitably, the metal chelating beta-diketone extractant is dissolved in kerosene with about 10–15% of a conditioning agent. Advantageously, the conditioning agent is an alcohol that contains about 10 carbon atoms with decanol being preferred. A preferred hydrocarbon is kerosene. An example of a preferred hydrocarbon is Kermac 470B ®, which is marketed by Kerr-McGee. The ratio of metal chelating beta-diketone to alcohol to hydrocarbon to be used is governed by considerations such as speed and completeness of phase separations and concentration of cobalt in the liquor to be extracted. When decanol and Kermac 470B ® are selected for use as the alcohol and the hydrocarbon respectively, the optimum decanol concentration is about 15 volume percent with a concentration range of about 10 to 20 volume percent being operative.

The maximum loading capacity of cobalt (II) on the 5 volume percent beta-diketone extractant solution is about 2.6 grams per liter. Beyond this level precipitation occurs in the organic phase. An organic solution containing about 5 volume percent of beta-diketone extractant, is typically sufficient to remove all the cobalt encountered from an ammoniacal leach of spent catalysts. Thus, it is preferred that the organic extractant solution for spent catalysts contains about 5 volume percent beta-ketone and about 15 volume percent decanol and about 75 to 85 volume percent Kermac 470B. Suitably the extraction step is carried out at a temperature in the range from about room temperature to about 40° C. and is carried out in one stage or two stages of countercurrent extraction. The loading of cobalt (II) on a beta-diketone extraction is strongly pH dependent. Cobalt (II) begins to load in weakly acidic solutions with the maximum loading taking place between pH 7.5 and 9.5. Thus, pH adjustment by evaporation of ammonia from the leach liquor prior to extraction of nickel values aids cobalt (II) extraction. If necessary, the pH may be further adjusted at this time by addition of sulfuric acid or ammonium hydroxide depending on whether the pH needs to be adjusted upward or downward. It has been found that extractions are favorable in solutions with less than 50 grams per liter of ammonia concentration.

The organic phase containing cobalt may be stripped by several of any alternative methods. One conventional stripping technique frequently used, is stripping the cobalt values with sulfuric acid to produce cobalt sulfate in an aqueous phase. Another stripping method found to work is the use of an ammonia and ammonium salt solution to strip cobalt from the organic phase.

An alternative method is adding other metallic ions, for example, copper (II) or nickel (II), to "crowd" the cobalt from the organic extractant freeing the cobalt into an aqueous solution.

The aqueous solutions of Group VIII metals produced by this invention can be processed further to produce pure metal or a salt that can be directly reused to form new catalyst. Nickel or cobalt can be electrowon or directly reduced by hydrogen gas. The aqueous solutions of nickel or cobalt can be used directly as a metal source for impregnating or comulling new catalyst.

DETAILED DESCRIPTION OF THE DRAWING

FIG. 1 illustrates an embodiment of this invention for recovering metals from spent catalysts known to contain cobalt, nickel, molybdenum and vanadium. The catalyst is first roasted under conditions where the temperature is controlled to less than 600° C. The spent roasted catalyst is then leached at 90° C. until cobalt values in solution start to decrease. The pregnant liquor is then extracted with a quaternary amine, forming a first set of two streams: an organic stream containing molybdenum and vanadium, and an aqueous stream containing cobalt and nickel. The first organic stream is stripped with an aqueous solution of ammonium bicarbonate. Hydrochloric acid is added to the aqueous strip solution and ammonium metavanadate is precipitated. The volume of the solution is then reduced and ammonium molybdate is precipitated.

Excess ammonia is removed from the first aqueous stream, by heating the solution. The solution, which is exposed to air insuring that cobalt is in the trivalent oxidation state, is extracted with LIX64N ®, removing the nickel and creating a second set of two streams: an aqueous, containing cobalt and any impurities and an organic containing nickel. The second organic solution is stripped with sulfuric acid, forming an acidic nickel containing sulfate solution. The cobalt in the second aqueous stream is reduced over cobalt shot, and extracted with LIX®51, thereby forming a third set of aqueous and organic streams.

The third aqueous stream is recycled to the leach step, enriched in ammonia removed from the ammonia distillation step. The third organic stream is stripped with solution of a solution of ammonia and ammonium carbonate.

This process provides a convenient and economical way of recovering metals from spent metals laden catalysts. The organic solutions can be recycled after use and the aqueous solution and ammonia can be recycled. The use of carbonate and bicarbonate ions throughout the process prevents the introduction of extraneous ions that are difficult to remove. All four metals are separated and purified by this process. Molybdenum and vanadium are recovered as crystalline materials, and cobalt and nickel as aqueous solutions. Salts of cobalt or nickel can be precipitated, or the reduced metals recovered by conventional methods, for example electrowinning.

What is claimed is:

1. A process for separating the metal values in a pregnant liquor from an ammoniacal ammonium aqueous leach solution containing:
   (i) at least one metal value selected from the group consisting of cobalt and nickel; and
   (ii) at least one metal value selected from the group consisting of vanadium and molybdenum;
comprising the steps of:
   (a) transferring said molybdenum and vanadium metal values from said pregnant liquor into a first organic solution by means of a first organic liquid extractant comprising a quaternary ammonium compound;
   (b) stripping said first organic solution with a first aqueous ammonium bicarbonate stripping solution to form an aqueous solution containing said molybdenum and vanadium metal values;
   (c) transferring nickel metal values from said pregnant liquor into a second organic solution by means of an organic nickel extractant comprising an oxime;
   (d) reducing cobalt metal values in said pregnant liquor to divalent cobalt;
   (e) transferring cobalt metal values from said pregnant liquor into a third organic solution by means of an organic cobalt extractant comprising a beta-diketone; and
   (f) stripping each of said second and third organic solutions with aqueous stripping solutions to form a cobalt-containing aqueous solution and a nickel-containing aqueous solution.

2. The process of claim 1 wherein said metal values include oxyanions of molybdenum and vanadium.

3. The process of claim 1 wherein said nickel extractant comprises oximes selected from the group consisting of dioximes and hydroxy-oximes.

4. The process of claim 3 wherein ammonia is separated from said pregnant liquor before step (c).

* * * * *

UNITED STATES PATENT AND TRADEMARK OFFICE
CERTIFICATE OF CORRECTION

PATENT NO. : 4,434,141
DATED : February 28, 1984
INVENTOR(S) : GALE L. HUBRED
DEAN A. VAN LEIRSBURG It is certified that error appears in the above-identified patent and that said Letters Patent are hereby corrected as shown below:

Col. 3, line 48, "$MA^{y-} + (y/x)R_xA$" should read --$MA^{y-} + y/x\ R_xA$--.

Col. 3, line 63, "bicaronate" should read --bicarbonate--.

Signed and Sealed this

Twenty-first Day of May 1985

[SEAL]

Attest:

DONALD J. QUIGG

Attesting Officer     Acting Commissioner of Patents and Trademarks